May 16, 1950 W. E. BRADLEY 2,508,058
METHOD OF MAKING PICTURE PROJECTION SCREENS
Filed Jan. 27, 1947

Inventor:—
William E. Bradley
by his Attorneys
Howson & Howson

Patented May 16, 1950

2,508,058

UNITED STATES PATENT OFFICE 2,508,058

METHOD OF MAKING PICTURE PROJECTION SCREENS

William E. Bradley, Springfield Township, Montgomery County, Pa., assignor to Philco Corporation, Philadelphia, Pa., a corporation of Pennsylvania Application January 27, 1947, Serial No. 724,591

3 Claims. (Cl. 88—28.9)

This invention relates to light-directing devices and more particularly to picture projection screens of the general character hereinafter mentioned. The invention further relates to a novel method of making such a device or screen, which method greatly enhances certain desired light diffusion properties thereof.

The present invention has for its principal object the provision of a novel and improved method of making such a device.

In accordance with a prior method, a picture projection screen, especially suitable for a television receiver, is made by first providing a light-reflecting sheet having minute parallel elongated optical elements on its reflecting surface which render it strongly diffusing in a direction at right angles to said elements, and then applying to said surface a coating which provides minute lenticular elements on said surface, thereby imparting to the screen an additional light diffusing property. Preferably, the screen is formed of a stainless steel sheet having unidirectional scratches or grooves which render the screen strongly diffusing at right angles to the direction of the grooves. While a flat or spherically concave screen may be employed, it is preferred that the screen be cylindrically-concave in the direction of the grooves, so that it has desirable light directivity in that direction. Such a screen confines the reflected light to a desired area or space and has desirable light diffusion properties.

An important feature of such a screen is that it is provided with the above-mentioned minute lenticular elements substantially covering its surface. I have discovered that the screen may be greatly improved from the standpoint of the optical results achieved, and this without sacrifice of the inexpensiveness inherent in a screen of the above-mentioned type. I accomplish this by subjecting the reflecting surface to a plurality of successive, incomplete applications of sprayed material, such as lacquer, of such consistency (and the droplets of which are so spaced) that, upon drying, minute individual lenses are formed. After a number of such applications, the reflecting surface becomes substantially covered with these tiny lenses which cumulatively form a light-diffusing contour wherein the individuality of said lenses is substantially preserved. Experience has shown that, in practice, this method results in a surface which is more satisfactory, optically, than the surface which results from application of a single relatively heavy coating of lacquer. A more important one of the reasons for this is that when a single heavy coating is employed an agglomeration of droplets frequently results. This effect produces elevated areas, or patches, of substantially zero slope. Such patches, in turn, result in undesirably high specular reflection.

As in the prior screen, the screen provided by the present invention has desirable diffusing power in a direction at right angles to the direction of the diffusion caused by the above-mentioned elongated elements.

In carrying out the present invention, it is highly desirable that the applied lacquer be permitted to dry completely after each application and before proceeding with the following application. In this way it is possible to ensure that the deposition of individually formed lenses will be cumulative. For best results in a reflective system, the lacquer should be of high transparency.

Since the invention is particularly concerned with the manufacture of an improved screen for television picture projection, the concept will be described with reference to such adaptation. However, the method provided by the invention is applicable in any instance where it is desired to provide a light-controlling device of the character above mentioned.

Reference is now made to the accompanying drawing, wherein.

Figure 2:
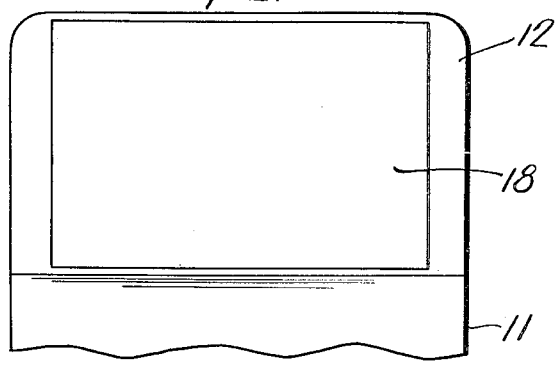
Fig. 2 is a face view of the screen.
Figure 1:
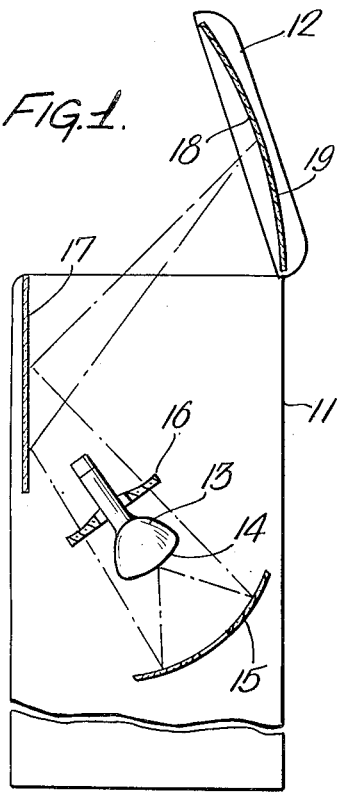
Fig. 1 is a schematic illustration of a television receiver employing a picture projection screen of the character with which the present invention is concerned.

Referring first to Fig. 1, there is shown a picture projection system for a television receiver, the parts of which are housed within a cabinet shown in general outline at 11, the cabinet having a hinged lid 12. For purposes of illustration, there is shown a preferred form of projection system, which comprises a picture tube 13 having a fluorescent screen or target 14, a spherical mirror 15, a correcting plate 16, a plane reflector 17, and a light-reflecting picture screen 18. The screen is rectangular in shape, as shown in Fig. 2, and it is preferably cylindrically concave with respect to a horizontal axis of curvature, as shown in Fig. 1. In operation, a small primary image is formed on the tube screen 14, and this image is projected by the optical system to form a magnified or enlarged image on the viewing screen 18, which is carried by lid 12. Since the present invention is concerned only with the screen 18 and the method of fabricating the same, further description of the projection system is unnecessary.

Figure 3:
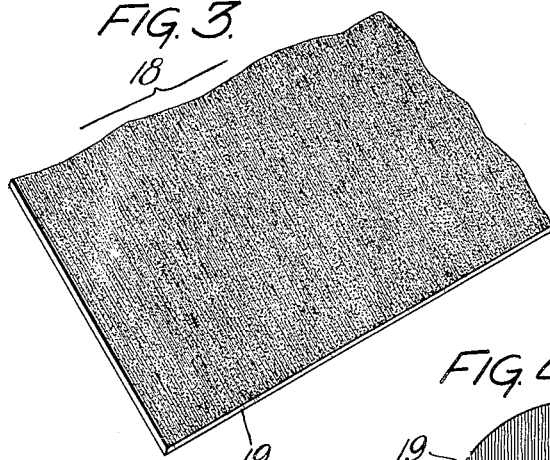
Fig. 3 shows a portion of the screen on an enlarged scale.

Fig. 3 shows a portion of the screen provided by the present invention. Under strong magnification (e. g. 100 diameters), the finished screen has substantially the appearance of the magnified portion shown in Fig. 7. The base member 19 of the screen has minute elongated optical elements 20 (best visible in Figs. 3 to 6) extending vertically or in the direction of curvature of the screen, and a multiplicity of minute lenticular elements 21 are superimposed on the elongated optical elements 20.

Figure 4:
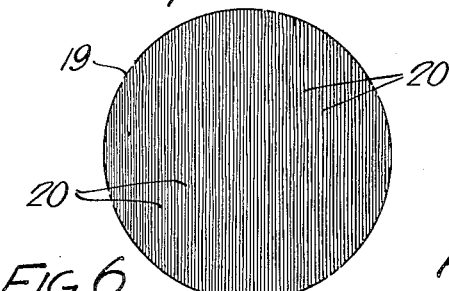
Figs. 4 to 7 show a highly magnified portion of the screen at successive stages during manufacture thereof according to the present invention.

In carrying out the method of the present invention, the first step is the provision of the light-reflecting sheet 19 having the minute elongated optical elements 20 thereon. A greatly magnified portion of such sheet is shown in Fig. 4. The sheet 19 may comprise a specularly reflective sheet having a large number of minute parallel scratches or grooves in its reflecting surface. It may be formed by polishing a sheet of reflecting metal to render it specularly reflective, and then subjecting it to a grinding operation to provide the minute vertical grooves in the form of random scratches. For example, the sheet may be formed of stainless steel known in the art as austenitic chromium-nickel-iron containing about 18% Cr, 8% Ni and 74% Fe.

In accordance with the present invention, the scratched or grooved sheet is subjected to a number of successive incomplete applications of lacquer, each application causing the formation of isolated droplets, as hereinbefore mentioned and as will be more fully described in what follows.

While, as will later appear, the nature of the lacquer is determined by the optical results desired, one lacquer which has given highly satisfactory results in the fabrication of a reflective screen intended for use in television picture projection systems is supplied by the Gilbert Spruance Company, and is known commercially as Spruance Flat Lacquer. This lacquer has the following constituent components in the relative proportions indicated:

*Lacquer composition*

| Item | Constituent | Per Cent by Weight |
|---|---|---|
| 1 | R. S. ¼ second nitrocellulose | 1.3 |
| 2 | R. S. ½ second Nitrocellulose | 2.2 |
|  | (The foregoing are commercial grades of Nitrocellulose, ½ second referring to viscosity measurement.) |  |
| 3 | "Amberol" 801 (A phenol-modified resin, obtainable from Resinous Products and Chemical Co.). | 2.5 |
| 4 | "Rezyl" 99-4 (An alkyd resin, supplied by the American Cyanamide Co.). | 1.8 |
| 5 | Tricresyl Phosphate | 1.15 |
| 6 | Blown Castor Oil | 1.15 |
| 7 | "Santocel" (A silica aerogel, obtainable from the Monsanto Chemical Co.). | 0.9 |
| 8 | Butyl Acetate | 25.5 |
| 9 | Ethyl Acetate | 8.0 |
| 10 | Butyl Alcohol | 8.0 |
| 11 | S. D. No. 1 Alcohol (A commercial grade of "specially denatured" alcohol.). | 8.0 |
| 12 | Lactol Spirits (Toluol substitute) | 12.0 |
| 13 | Toluol | 27.0 |
|  |  | 100.0 |

The foregoing specification is given by way of example only since, as pointed out hereinafter, the invention contemplates the use of other suitable lacquers and, in fact, equivalent materials other than lacquer.

Figure 5:
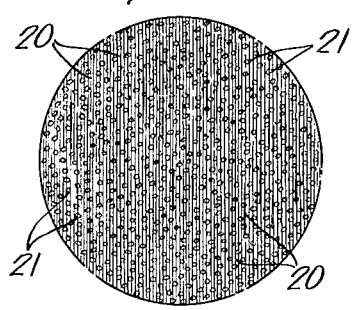
Figure 6:
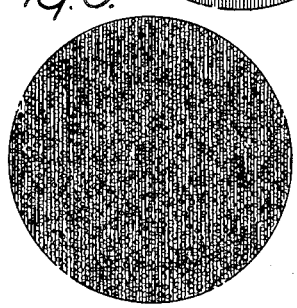
Figure 7:
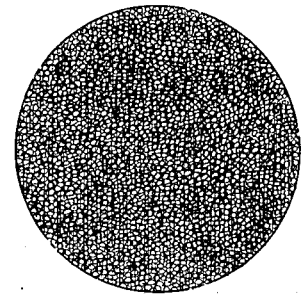

While the invention is not limited to a particular number of spray applications, experience has shown that two or three applications give highly satisfactory results. It is, however, essential that the number of applications be sufficient to ensure that the reflecting surface of the base sheet becomes substantially covered with minute lenticular elements, or lenses, formed by the dried droplets of lacquer. Assuming that there are three applications of lacquer, Figs. 5 to 7 show a magnified position of the screen after these successive applications. As previously stated, it is important that the lacquer be permitted to dry after each application, so that the deposition of the individually formed lenses will be cumulative, and to avoid the aforesaid areas or patches of substantially zero slope.

While, in the broad aspect of the invention, the lacquer may be applied in any suitable manner, it is preferable to use a spray gun for this purpose. A gun of the following type was used in the manufacture of screens, in the manner described below.

Type: Binks No. 19
Air nozzle: No. 66S
Air pressure: 45 lbs. per square inch
Control settings:
  1. Spray control—1½ turns counterclockwise from the position for a round spray.
  2. Material control—3 turns counterclockwise from the "off" position.

Good results have been obtained by maintaining the screen to be sprayed in a vertical position. The operator sprays successive horizontal strips with a uniform motion of the gun. The spray distance (specified below) is carefully controlled to obtain, in the mixture reaching the screen, a satisfactory ratio of solvent to the dissolved lacquer constituents. The following data represents the technique used in spraying a screen 15" high x 20" wide:

Spray distance (gun to screen)—15"
"Scanning" rate—approximately 20" per second
No. of "scans" per coat—5 or 6
Drying time between coats—approximately 15 min.

The foregoing data, as well as the gun settings given, were used in a representative operation including two coats. If it be desired to increase the number of coats, the process is modified to reduce the amount of material deposited per coat. This can be accomplished, for example, either by increasing the proportion of solvents in the original mixture and establishing a new optimum spray distance, or by varying the material control setting of the spray gun.

In general, the individual droplets collectively should cover an area of the order of 50% of the entire surface, as a result of each application. It should be understood that the amount of lacquer deposited during each application is substantially constant or, in other words, that the coverage of each successive application should be measured in terms of coverage of an unsprayed sheet. Preferably, each application should deposit droplets of lacquer upon less than 60% of the entire surface of the sheet, although the invention contemplates any desired degree of complete coverage which will accomplish useful results.

In addition to the foregoing, the following general methods are useful in determining and establishing the desired performance of the layer of elemental lacquer lenses:

A. Microscopic examination:

A correlation can be established between (a) the size, shape and "population density" of the lacquer particles and (b) the diffusing characteristic (angular distribution of reflected light) of the screen.

B. Point source imagery:

The lacquer treatment of a grooved screen converts the image of a point source from a sharp bright line to a broad diffuse band. The diffusing characteristic of the screen may be inferred directly from the distribution of the light intensity within this "fog band."

C. Direct measurement:

Quantitative measurements of reflected light intensity versus angle of observation can be obtained by reflectometer or illuminometer methods known in the art.

Analysis of any of the above tests to observe the optical results realized by samples made under different conditions, makes it possible to specify the manufacturing conditions required to produce satisfactory screens for varying purposes.

During the construction of a screen according to the present invention, the deposited droplets tend to spread out upon the screen surface, remaining relatively thick at their centers, to form individual simple convex lenses. The free surface of each droplet, in the liquid state, wets a certain amount of the screen surface and assumes a meniscus form, the curvature of which is determined by the following two factors; firstly, by the relation of the capillarity existing between the liquid and the screen surface—on the one hand—and by the cohesion of the molecules forming the lacquer on the other. Secondly, the curvature and therefore the focal length of the minute lenses is determined by the relative proportion of volatile material in the lacquer. This volatile material escapes during drying, causing the droplets to shrink in height (although not appreciably in diameter), from which it is apparent that the focal length of the minute lenses can be adjusted by controlling the amount of thinner in the lacquer, and that the angle of diffusion of the screen can be controlled directly by the concentration of the lacquer and indirectly by the number of applications. Relatively thick lacquer results in greater diffusion, while very dilute lacquer will afford lesser diffusion.

Thus, a screen constructed in accordance with the present invention has the desirable characteristics set forth herein and also has more perfect light-diffusing properties, due to the manner in which the microscopic lenses are formed. Further important advantages reside in the controllability of the optical characteristics, and in the uniformity of the results achieved.

The screen provided by the present invention is novelly characterized, as distinguished from the prior screen of this type, in that the individuality of the minute lenses is preserved, thus providing a light-diffusing contour which is substantially free from any flat areas. It is by reason of this distinction that the screen of the present invention is a substantial improvement over the prior screen.

While it is preferred to employ lacquer in the construction of a light-controlling device or screen in accordance with the present invention, in its broader aspect, the invention contemplates the use of other equivalent materials and is not limited to the use of lacquer. One example of other materials which may be utilized is of a suitable fusible salt deposited in the form of droplets. Such droplets may be deposited in successive applications over the desired proportion of the screen surface, heat being applied with each application to cause said droplets to spread out upon the surface and assume the desired lenticular form, upon drying. In any case, however, it is important that the material be not subject to changes in color or light transmissivity.

While the concepts of the present invention have particular utility, as applied to light-directing devices of the reflective type, it should be understood that the principles of the invention are also applicable to screens or other devices having refractive optical characteristics. Such a refractive screen would have essentially the same physical characteristics as those described with reference to the reflective case, except that both the material of which the screen is made, and the diffusing coating or surface associated therewith, would be light transmissive. In such case, the screen may be formed of a suitable plastic sheet with scratches therein. The refractive screen would have the same appearance as shown in Figs. 2 and 3.

It will be understood, of course, that the invention contemplates such other embodiments or modifications as may occur to those skilled in the art.

I claim:

1. A method of making a picture projection screen, which comprises providing a screen member having on a surface thereof a plurality of elongated generally parallel strongly diffusing elements extending in one direction, depositing on and over the extent of said surface, in insufficient number to cover the entire area of said surface, droplets of a liquid substance having the inherent property of forming minute lenticular elements as the droplets dry, and repeating the aforementioned deposition step a sufficient number of times to effect substantially complete coverage of said surface with minute lenticular elements, permitting the deposited droplets to dry after each deposition and before the next succeeding deposition.

2. The method according to claim 1, wherein the number of droplets applied to the screen surface during each deposition step is such as to cover less than 60% of the total area of said surface.

3. A method of making a picture projection screen, which comprises providing a screen member having on a surface thereof a plurality of elongated generally parallel strongly diffusing elements extending in one direction, depositing on and over the extent of said surface, in insufficient number to cover the entire area of said surface, droplets of lacquer having the inherent property of forming minute lenticular elements as the droplets dry, and repeating the aforementioned deposition step a sufficient number of times to effect substantially complete coverage of said surface with minute lenticular elements, permitting the deposited droplets to dry after each deposition and before the next succeeding deposition.

WILLIAM E. BRADLEY.

(References on following page)

REFERENCES CITED

The following references are of record in the file of this patent:

UNITED STATES PATENTS

| Number | Name | Date |
|---|---|---|
| 78,156 | Swan | May 19, 1868 |
| 1,783,973 | Newman | Dec. 9, 1930 |
| 1,926,732 | North | Sept. 12, 1933 |
| 1,958,036 | Draper | May 8, 1934 |
| 2,142,668 | Bucy | Jan. 3, 1939 |
| 2,184,153 | Schwarz | Dec. 19, 1939 |
| 2,256,692 | Stableford | Sept. 23, 1941 |
| 2,257,999 | Bodde | Oct. 7, 1941 |

FOREIGN PATENTS

| Number | Country | Date |
|---|---|---|
| 797,523 | France | Feb. 16, 1936 |